United States Patent
Shim et al.

(10) Patent No.: US 8,077,687 B2
(45) Date of Patent: *Dec. 13, 2011

(54) BROADCAST/MULTICAST SERVICE METHOD BASED ON USER LOCATION INFORMATION

(75) Inventors: Dong-Hee Shim, Seoul (KR); Min-Jung Shon, Seoul (KR); Sung-Mu Son, Gyeonggi-Do (KR); Kyu-Sung Han, Seoul (KR)

(73) Assignee: LG Electronics Inc., Seoul (KR)

( * ) Notice: Subject to any disclaimer, the term of this patent is extended or adjusted under 35 U.S.C. 154(b) by 145 days.

This patent is subject to a terminal disclaimer.

(21) Appl. No.: 12/366,605

(22) Filed: Feb. 5, 2009

(65) Prior Publication Data

US 2009/0141665 A1 Jun. 4, 2009

Related U.S. Application Data

(63) Continuation of application No. 11/155,531, filed on Jun. 16, 2005, now Pat. No. 7,672,280.

(60) Provisional application No. 60/579,669, filed on Jun. 16, 2004.

(30) Foreign Application Priority Data

Sep. 3, 2004 (KR) .................. 10-2004-0070512
Nov. 5, 2004 (KR) .................. 10-2004-0090064

(51) Int. Cl.
*H04W 4/00* (2009.01)
*H04W 24/00* (2009.01)
*H04H 20/71* (2008.01)
(52) U.S. Cl. ............... 370/338; 370/312; 455/456.1
(58) Field of Classification Search .......... 370/338, 370/328, 312, 432; 455/466, 456.1–456.6, 455/412.1–412.2, 414.1–414.3, 418–420
See application file for complete search history.

(56) References Cited

U.S. PATENT DOCUMENTS 5,852,775 A 12/1998 Hildary
(Continued)

FOREIGN PATENT DOCUMENTS

EP 1420553 A1 5/2004
(Continued)

OTHER PUBLICATIONS

Open Mobile Alliance, "Secure User Plane Location Architecture," Draft Version 1.0, pp. 1-22, XP-002484690, Feb. 23, 2004.
(Continued)

*Primary Examiner* — Brandon Miller
(74) *Attorney, Agent, or Firm* — Birch, Stewart, Kolasch & Birch, LLP

(57) ABSTRACT

A method and device for providing a broadcast/multicast service are discussed. According to an embodiment, the invention provides a method comprising: receiving, by a client module, a service guide including contents information with respect to one or more contents from a broadcast/multicast server; transmitting, by the client module, a broadcast/multicast request message with respect to contents selected by a user of a specific terminal among the contents information included in the received service guide to the broadcast/multicast server; transmitting, by the client module, a location tracking request message with respect to the specific terminal to a network entity; receiving a response message with respect to the location tracking request message, the response message including a location tracking result from the network entity; transmitting, by the client module, location information of the specific terminal to the broadcast/multicast server.

13 Claims, 12 Drawing Sheets

U.S. PATENT DOCUMENTS

| | | | |
|---|---|---|---|
| 6,052,591 A | 4/2000 | Bhatia | |
| 6,259,405 B1 | 7/2001 | Stewart et al. | |
| 6,677,894 B2 | 1/2004 | Sheynblat et al. | |
| 6,819,268 B2 | 11/2004 | Wakamatsu et al. | |
| 6,985,742 B1 | 1/2006 | Giniger et al. | |
| 6,996,393 B2* | 2/2006 | Pyhalammi et al. | 455/412.1 |
| 7,024,208 B2 | 4/2006 | Kaise | |
| 7,027,801 B1 | 4/2006 | Hall et al. | |
| 7,054,619 B2 | 5/2006 | Kettunun et al. | |
| 7,068,189 B2* | 6/2006 | Brescia | 340/995.1 |
| 7,103,313 B2 | 9/2006 | Heinonen et al. | |
| 7,181,225 B1 | 2/2007 | Moton, Jr. et al. | |
| 7,239,878 B2 | 7/2007 | Bazin et al. | |
| 7,263,086 B2 | 8/2007 | Viikari et al. | |
| 7,264,157 B2* | 9/2007 | Ishizuka | 235/383 |
| 7,301,927 B2 | 11/2007 | Lee et al. | |
| 7,406,063 B2 | 7/2008 | Jung et al. | |
| 7,558,584 B2 | 7/2009 | Yamamoto et al. | |
| 7,672,280 B2* | 3/2010 | Shim et al. | 370/338 |
| 2002/0099769 A1 | 7/2002 | Yasui et al. | |
| 2002/0138650 A1 | 9/2002 | Yamamoto et al. | |
| 2002/0186412 A1* | 12/2002 | Murashita | 358/1.16 |
| 2003/0060214 A1 | 3/2003 | Hendrey et al. | |
| 2003/0097374 A1* | 5/2003 | Himeno | 707/104.1 |
| 2003/0125033 A1 | 7/2003 | Rindsburg et al. | |
| 2004/0008657 A1 | 1/2004 | Lee et al. | |
| 2004/0224702 A1* | 11/2004 | Chaskar | 455/456.3 |
| 2005/0030708 A1* | 2/2005 | Kawasaki et al. | 361/683 |
| 2005/0097595 A1 | 5/2005 | Lipsanen et al. | |
| 2005/0177638 A1 | 8/2005 | Oh | |
| 2005/0221843 A1 | 10/2005 | Friedman et al. | |
| 2006/0030312 A1 | 2/2006 | Han et al. | |

FOREIGN PATENT DOCUMENTS

| | | | |
|---|---|---|---|
| JP | 2001-318925 A | 11/2001 | |
| JP | 2001-337879 A | 12/2001 | |
| JP | 2002-216021 | 8/2002 | |
| JP | 2002-216021 A | 8/2002 | |
| JP | 2003-150475 A | 5/2003 | |
| JP | 2004-166197 A | 6/2004 | |
| KR | 10-2002-0046769 A | 6/2001 | |
| KR | 10-2001-0074057 | 8/2001 | |
| KR | 10-2001-0074057 A | 8/2001 | |
| KR | 10-2002-0046769 | 6/2002 | |
| KR | 10-2002-0048013 | 6/2002 | |
| KR | 10-2002-0048013 A | 6/2002 | |
| RU | 2218671 | 12/2003 | |
| WO | WO-00/35216 | 6/2000 | |
| WO | WO 00/35216 A1 | 6/2000 | |
| WO | WO-01/74102 A1 | 10/2001 | |
| WO | WO-03/034765 A1 | 4/2003 | |

OTHER PUBLICATIONS

International Search Report for Application No. PCT/KR2005/001839, dated Sep. 29, 2005.

U.S. Notice of Allowance and Fee(s) Due for co-pending U.S. Appl. No. 11/155,531, dated Oct. 28, 2009.

U.S. Office Action for co-pending U.S. Appl. No. 11/155,531, dated Oct. 28, 2008.

* cited by examiner

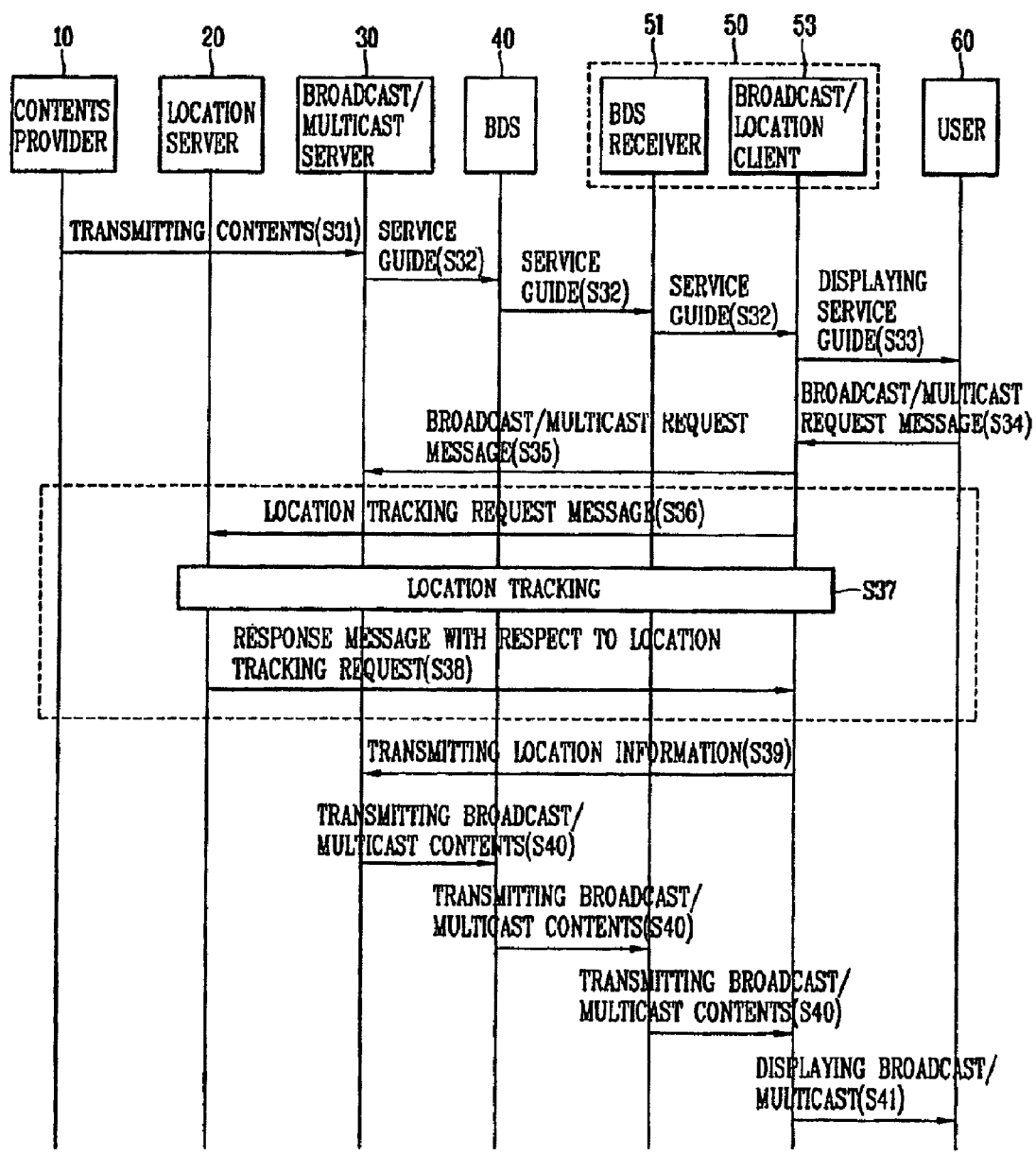

FIG. 4

| NAME | TYPE | CATEGORY | CARDINALITY | DESCRIPTION |
|---|---|---|---|---|
| BROADCAST_AREA | E | OPTION | 1 | BROADCAST AREA TO INCLUDE LOCATION INFORMATION FOR BCAST CONTENTS SUB-ELEMENTS: TARGET_AREA, HOR_ACC |
| TARGET_AREA | E1 | OPTION | 0..N | THE TARGET AREA TO DISTRIBUTE CONTENTS (AS SPECIFIED IN THE OMA MLP TS WITH MODIFICATION) SUB_ELEMENTS: SHAPE OR CC OR NAME_AREA OR ZIP_CODE |
| HOR_ACC | E1 | OPTION | 0..N | HORIZONTAL ACCURACY IN METERS (AS SPECIFIED IN THE OMA MLP TS) |
| SHAPE | E2 | OPTION | 0..1 | SHAPES USED TO REPRESENT A GEOGRAPHIC AREA THAT DESCRIBES (AS SPECIFIED IN THE OMA MLP TS) |
| CC | E2 | OPTION | 0..1 | COUNTRY CODE, 1~3 DIGITS e.g. 355 FOR ALBANIA (AS SPECIFIED IN THE MLP TS) |
| NAME_AREA | E2 | OPTION | 0..1 | GEOPOLITICAL NAME OF AREA SUCH AS 'SEOUL' (AS SPECIFIED IN THE MLP TS) |
| ZIP_CODE | E2 | OPTION | 0..1 | ZIP CODE |
| <PROPRIETARY ELEMENTS> | | | | ANY NUMBER OF PROPRIETARY OR APPLICATION-SPECIFIC ELEMENTS THAT ARE NOT DEFINED IN THIS SPECIFICATION |

FIG. 5A

```
<slir ver="3.2.0" res_type="SYNC">
  <msids> (ID OF TERMINAL WHICH HAS REQUESTED LOCATION TRAKING)
    <msid type="IPV4">93.10.0.250</msid> (INDICATING ID OF TERMINAL AS IP ADDRESS
                                          OF IPv4 FORM)
  </msids>
  <eqop> (INDICATING ACCURACY OF LOCATION TRACKING)
    <resp_req type="LOW_DELAY"/> (INDICATING ACCURACY WITH RESPECT TO TEMPORAL DELAY)
    <hor_acc>1000</hor_acc> (INDICATING HORIZONTAL ACCURACY OF ACTUAL LOCATION
                             TRACKING VALUE)
  </eqop>
  <loc_type type="CURRENT_OR_LAST"/> (IN LOCATION TRACKING, IN CASE THAT IF CURRENT
                             VALUE CAN BE ESTIMATED, THE CURRENT VALUE IS TRANSFERRED,
                             OR OTHERWISE, THE LATEST VALUE IS TRANSMITTED)
  <prio type="HIGH"/> (IN CASE OF SEVERAL LOCATION TRACKING REQUESTS, PRIORITY LEVEL
                      OF EACH LOCATION TRACKING REQUEST CAN BE DESIGNALTED)
</slir>
```

FIG. 5B

```
<slia ver="3.0.0">
  <pos>
    <msid>461011334411</msid> (ID OF TERMIAL WHICH HAS REQUESTED LOCATION TRACKING)
    <pd>
      <time utc_off="+0200">20020623134453<time> (TIME AT WHICH LOCATION TRACKING
                                                  WAS MADE)
      <shape> (INDICATING ACCURACY OF LOCATION TRACKING. IN THIS EXMAPLE, THE
               ACCURACY IN A CIRCLE WITH A RADIUE DESIGNATED CENTERING ON X, Y
               COORDINATES SHOWN BELOW)
        <CircularArea srsName="www.epsq.org#4326">
          <coord>
            <X>30 16 28.308N</X>
            <Y>45 15 33.444E</Y>
          </coord> (ACTUAL LOCATION TRACKING VALUES INDICATED BY X, Y COORDINATES)
          <radius>240</radius> (VALUE INDICATING A RADIUS DESIGNATED CENTERING ON X, Y
                                COORDINATES)
        <CircularArea>
      </shape>
    </pd>
  </pos>
</slia>
```

FIG. 5C

```
<slirep ver="3.0.0">
  <req_id>25267</req_id>
  <pos>
    <msid type="IPV6">10:A1:45:23:B7:89</msid>  (INDICATING ID OF TERMINAL AS IP ADDRESS
                                                  OF AN IPv6 FORMAT)
    <pd>
      <time utc_off="+0300">20020813010423</time>  (TIME AT WHICH LOCATION TRAKING
                                                     WAS MADE)
      <shape>  (INDICATING ACCURACY OF LOCATION TRACKING. IN THIS EXMAPLE, THE
                ACCURACY IN A CIRCLE WITH A RADIUS DESIGNATED CENTERING
                ON X, Y COORDINATES SHOWN BELOW)
        <CircularArea srsName="www.epsq.org#4326">
          <coord>
            <X>35 03 25.244N</X>
            <Y>135 47 08.711E</Y>
          </coord>  (ACTUAL LOCATION TRACKING VALUES INDICATED BY X, Y COORDINATES)
          <radius>15</radius>  (VALUE INDICATING A RADIUS DESIGNATED CENTERING ON X, Y
                                COORDINATES)
        </CircularArea>
      </shape>
    </pd>
  </pos>
</slirep>
```

FIG. 6A

```
<llrr ver="3.2.0">
  <msids>
    <msid>461011678298</msid> (ID OF TERMINAL WHICH HAS REQUESTED LOCATION TRACKING)
  </msids>
  <interval>00003000</interval> (PERIOD FOR REQUESTING PERIODICAL LOCATION TRACKING)
  <start_time utc_off="+0300">20021003112700</start_time> (TIME FOR STARTING PERIODICAL
                                                           LOCATION TRACKING)
  <stop_time utc_off="+0300">20021003152700</stop_time> (TIME FOR TERMINATING PERIODICAL
                                                         LOCATION TRACKING)
  <qop> (INDICATING ACCURACY OF LOCATION TRACKING)
    <hor_acc>100</hor_acc> (INDICATING HORIZONTAL ACCURACY OF ACTUAL LOCATION
                            TRACKING VALUE)
  </qop>
  <loc_type type="CURRENT"/> (IN CASE OF REQUESTING CURRENT VALUE IN LOCATING
                              TRACKING)
  <prio type="HIGH"/> (IN CASE OF SEVERAL LOCATION TRACKING REQUESTS, PRIORITY
                       LEVEL OF EACH LOCATION TRACKING REQUEST CAN BE DESIGNATED)
</llrr>
```

FIG. 6B

```
<llrr ver="3.0.0">
  <msids>
    <msid>461011678298</msid> (ID OF TERMINAL WHICH HAS REQUESTED LOCATION TRACKING)
  </msids>
  <llrr_event> (FACTOR FOR INDICATING SPECIFIC EVENT)
    <change_area type="MS_ENTERING" loc_estimates="TRUE"> (IN CASE OF ENTERING
                                                           SPECIFIC AREA)
      <target_area>
        <name_area>Seoul</name_area> (INDICATING SPECIFIC AREA, FOR EXAMPLE,
                                      HEREIN, SEOUL)
      </target_area>
    </change_area>
  </llrr_event>
  <qop> (INDICATING ACCURACY OF LOCATION TRACKING)
    <hor_acc>100</hor_acc> (INDICATING HORIZONTAL ACCURACY OF ACTUAL LOCATION
                            TRACKING VALUE)
  </qop>
  <loc_type type="CURRENT"/> (IN CASE OF REQUESTING CURRENT VALUE IN LOCATING
                              TRACKING)
  <prio type="HIGH"/> (IN CASE OF SEVERAL LOCATION TRACKING REQUESTS, PRIORITY LEVEL
                       OF EACH LOCATION TRACKING REQUEST CAN BE DESIGNALTED)
</llrr>
```

FIG. 6C

```
<tlrsr ver="3.0.0">
    <req_id>25293</req_id> CONFIRMING THAT LOCATION TRACKING REQUEST WHOSE REQUEST ID
                           IS 25293 HAS BEEN RECEIVED
</tlrsr>
```

FIG. 6D

```
<tlrsa ver="3.0.0">
    <result resid="4">UNKNOWN SUBSCRIBER</result> ( INFORMING THAT REQUESTED LOCATION
    TRACKING IS NOT POSSIBLE BY INDICATING AN ERROR MESSAGE OF 'UNKNOWN SUBSCRIBER')
</tlrsa>
```

FIG. 6E

```
<tlrep ver="3.0.0">
    <req_id>25267</req_in>
    <trl_pos trl_trigger="PERIODIC">
      <msid>461011678298</msid>
      <pd>
        <time utc_off="+0300">20020813010423</time>
        <shape>
          <CircularArea srsName="www.epsg.org#4326">
            <coord>
              <X>35 35 24.139N</X>
              <Y>139 35 24.754E</Y>
            </coord>
            <radius>15</radius>
          </CircularArea>
        </shape>
      </pd>
    </trl_pos>
    <time_remaining>00010000</time_remaining>
</tlrep>
```

FIG. 6F

```
<tlrsr ver="3.0.0">
    <req_id>25293</req_id>
</tlrsr>
```

FIG. 6G

```
<tlrsa ver="3.0.0">
    <req_id>25293</req_id>
</tlrsa>
```

FIG. 7

| SERVICE AREA | SERVICE LIST | TERMINAL ID | USER SETTING |
|---|---|---|---|
| A | ADVERTISEMENT | A1 | YES |
| | | A2 | YES |
| | | A3 | NO |
| | | ... | ... |
| | WEATHER INFORMATION | A1 | YES |
| | | A2 | YES |
| | | A3 | YES |
| | | ... | ... |
| | FASHION INFORMATION | A1 | NO |
| | | A2 | YES |
| | | A3 | NO |
| | | ... | ... |
| | STOCK INFORMATION | A1 | YES |
| | | A2 | YES |
| | | A3 | NO |
| | | ... | ... |
| B | ADVERTISEMENT | A1 | NO |
| | | A2 | NO |
| | | A3 | YES |
| | | ... | ... |
| | NEWS | A1 | YES |
| | | A2 | YES |
| | | A3 | YES |
| ... | ... | ... | ... |

BROADCAST/MULTICAST SERVICE METHOD BASED ON USER LOCATION INFORMATION

CROSS REFERENCE TO RELATED APPLICATIONS

Pursuant to 35 U.S.C. §119(a), §119(e) or §120, this application is a Continuation of U.S. patent application Ser. No. 11/155,531 filed Jun. 16, 2005, now U.S. Pat. No. 7,672,280 which claims the benefit of earlier filing date and right of priority to U.S. Provisional Application No. 60/579,669 filed on Jun. 16, 2004, Korean Application No. 10-2004-70512, filed on Sep. 3, 2004, and Korean Application No. 10-2004-90064, filed on Nov. 5, 2004. The contents of each of these applications are hereby incorporated by reference in their entirety.

BACKGROUND OF THE INVENTION

1. Field of the Invention

The present invention relates to a broadcast/multicast service and, more particularly, to a broadcast/multicast service based on user location information.

2. Description of the Related Art

A broadcast/multicast service, which provides sky wave broadcast or various supplementary information to mobile terminals, is a new type of service including both a broadcast service that usable information is provided by a service provider to all the clients who have subscribed for its service and a multicast service that information is provided only to a certain group of clients who have previously subscribed for a specific subject or contents.

Since the broadcast/multicast service can simultaneously provide the same information to multiple clients, network resources can be effectively managed, and in line with this, symbols for providing a high bandwidth application through the effective management of the network resources is increasing. In addition, clients' demands for a high level of services can be satisfied by providing diverse high speed services.

Clients can select only a favored service among various offered information to receive it, and in this respect, a method for selectively receiving information based on location information of a client has not been defined.

In addition, a related art broadcast/multicast service does not define a method for allowing a server to classify multimedia type information or various contents based on a location service of a user and provide it.

Namely, the related art broadcast/multicast service has a problem that the same information is simultaneously provided to multiple clients and the clients are to receive the information unconditionally regardless of their location.

SUMMARY OF THE INVENTION

Therefore, one object of the present invention is to provide a broadcast/multicast service method based on user location information, by which, in providing a service to a user who has subscribed for the service, a server can selectively provide user's favored broadcast or contents based on location information of a user.

Another object of the present invention is to provide a broadcast/multicast service method based on user location information, by which a user can selectively receive contents or information according to a current location.

To achieve at least the above objects in whole or in parts, there is provided a broadcast/multicast service method based on user location information in a broadcast/multicast service system, including: setting contents desired to be received in a particular area by a terminal; and transmitting the corresponding contents to the terminal by a broadcast/multicast server when the terminal is located in a pre-set area.

To achieve at least these advantages in whole or in parts, there is further provided a broadcast/multicast service method based on user location information including: transmitting, by a broadcast/multicast server which has received certain contents from a contents provider, a contents list including service-available area information to one or more terminals; receiving a broadcast/multicast request message with respect to one or more contents selected by a user of a specific terminal among the contents list; checking, by the broadcast/multicast server, location information of the specific terminal through a location server; and transmitting contents corresponding to a current location of the specific terminal to the specific terminal.

To achieve at least these advantages in whole or in parts, there is further provided a broadcast/multicast service method based on user location information including: transmitting, by a broadcast/multicast server which has received certain contents from a contents provider, a contents list including service-available area information to one or more terminals; receiving a broadcast/multicast request message with respect to one or more contents selected by a user of a specific terminal from the contents list; receiving current location information of the specific terminal from the specific terminal; and transmitting contents corresponding to a current location of the specific terminal to the specific terminal.

To achieve at least these advantages in whole or in parts, there is further provided a method for providing a broadcast/multicast service based on user location information in which a broadcast/multicast service is provided to at least one or more terminals each having a client performing transmission/reception through the same network, including: transmitting, by a broadcast/multicast server which has received one or more contents, the contents information to the client; receiving a broadcast/multicast request message with respect to contents selected by a user of a specific terminal among the contents information from the client; transmitting by the broadcast/multicast server a location tracking request message with respect to the specific terminal to a location server; receiving a response message with respect to the location tracking request from the location server; and transmitting contents corresponding to the location information to the specific terminal.

To achieve at least these advantages in whole or in parts, there is further provided a method for providing a broadcast/multicast service based on user location information in which a broadcast/multicast service is provided to at least one or more terminals each having a client performing transmission/reception through the same network, including: receiving, by the client, contents information with respect to one or more contents from a broadcast/multicast server; transmitting a broadcast/multicast request message with respect to contents selected by a user of a specific terminal among the contents information to the broadcast/multicast server; transmitting by the client a location tracking request message with respect to the specific terminal to a location server; receiving a response message with respect to the location tracking request including a location tracking result from the location server; transmitting, by the client, location information of the specific terminal to the broadcast/multicast server; and receiving contents corresponding to a current location of the specific terminal, among the selected contents, from the broadcast/multicast server.

To achieve at least these advantages in whole or in parts, there is further provided a method for providing a broadcast/multicast service based on user location information in which a broadcast/multicast service is provided to at least one or more terminals each having first and second clients each being connected to a different network, including: transmitting, by a broadcast/multicast server which has received one or more contents, the contents information to the first client; receiving a broadcast/multicast request message with respect to contents selected by a user of a specific terminal among the contents information from the second client; transmitting, by the broadcast/multicast server, a location tracking request message with respect to the specific terminal to a location server; receiving a response message with respect to the location tracking request from the location server; and transmitting contents corresponding to the location information among the contents, which have been selected by the user, to the first client.

To achieve at least these advantages in whole or in parts, there is further provided a method for providing a broadcast/multicast service based on user location information in which a broadcast/multicast service is provided to at least one or more terminals each having first and second clients each being connected to a different network, comprising: receiving, by the first client, contents information with respect to one or more contents from a broadcast/multicast server; transmitting, by the second client, a broadcast/multicast request message with respect to contents selected by a user of a specific terminal among the contents information to the broadcast/multicast server; transmitting, by the second client, a location tracking request message with respect to the specific terminal to a location server; receiving, by the second client, a response message with respect to the location tracking request including a location tracking result; transmitting, by the second client, location information of the specific terminal to the broadcast/multicast server; and receiving, by the first client, contents from the broadcast/multicast server.

Accordingly an embodiment, the invention provides a broadcast/multicast service method based on user location information, the method comprising: transmitting, by a broadcast/multicast server which has received certain contents from a contents provider, a service guide including service-available area information to one or more terminals; receiving, by the broadcast/multicast server, a broadcast/multicast request message with respect to one or more contents selected by a user of a specific terminal from the service guide; receiving current location information of the specific terminal from the specific terminal, the current location information of the specific terminal indicating an exact current location of the specific terminal; and transmitting, to the specific terminal, contents corresponding to the exact current location of the specific terminal among the contents selected by the user according to location based filtering by the broadcast/multicast server.

According to an embodiment, the invention provides a method for providing a broadcast/multicast service based on user location information in which a broadcast/multicast service is provided to at least one or more terminals, each terminal having a client module for performing transmission/reception through a network, the method comprising: receiving, by the client module, a service guide including contents information with respect to one or more contents from a broadcast/multicast server; transmitting, by the client module, a broadcast/multicast request message with respect to contents selected by a user of a specific terminal among the contents information included in the received service guide to the broadcast/multicast server; transmitting, by the client module, a location tracking request message with respect to the specific terminal to a network entity; receiving a response message with respect to the location tracking request message, the response message including a location tracking result from the network entity; transmitting, by the client module, location information of the specific terminal to the broadcast/multicast server, the location information of the specific terminal indicating an exact current location of the specific terminal; and receiving contents corresponding to the exact current location of the specific terminal, among the contents selected by the user, from the broadcast/multicast server.

According to an embodiment, the present invention provides a mobile terminal for providing a broadcast/multicast service based on user location information, the mobile terminal comprising: a transceiver configured to receive and transmit signals through a network; and a client module configured to cooperate with the transceiver and to: receive a service guide including contents information with respect to one or more contents from a broadcast/multicast server; transmit a broadcast/multicast request message with respect to contents selected by a user among the contents information include in the received service guide, to the broadcast/multicast server; transmit a location tracking request message with respect to the mobile terminal to a network entity; receive a response message with respect to the location tracking request message, the response message including a location tracking result from the network entity; transmit location information of the mobile terminal to the broadcast/multicast server, the location information of the mobile terminal indicating an exact current location of the mobile terminal; and receive contents corresponding to the exact current location of the mobile terminal, among the contents selected by the user, from the broadcast/multicast server.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 3 is a signal flow chart of a broadcast/multicast service method in accordance with a second embodiment of the present invention;

FIG. 4 illustrates examples of items included in a service guide entry in accordance with the present invention;

FIGS. 5A to 5C and 6A to 6G illustrate examples of a location tracking request message and a corresponding response message expressed in an XML (extensible Markup Language);

FIG. 7 shows an example of a search table of a database of a broadcast server;

DETAILED DESCRIPTION OF THE PREFERRED EMBODIMENTS

A broadcast/multicast service method based on user location information in accordance with the present invention will now be described with reference to the accompanying drawings.

The present invention proposes interface and operation between a terminal providing user's favored contents or information and one or more servers based on user location information. In particular, the present invention proposes a broadcast/multicast service by which a server filters various contents or information based on user location information and provides it to users in a pertinent service area. In this case, the server can provide the service to every user in the pertinent area, provide the corresponding service to a terminal which requests the service in the corresponding area, or provide the corresponding service to an area requested by the user.

In the present invention, when a user requests a broadcast/multicast service provided in a particular area, a broadcast/multicast server checks location information of the user and provides contents or information of the pertinent area. In this case, the broadcast/multicast server checks the user location information through a location server or checks user location information transmitted from the terminal.

Figure 1:
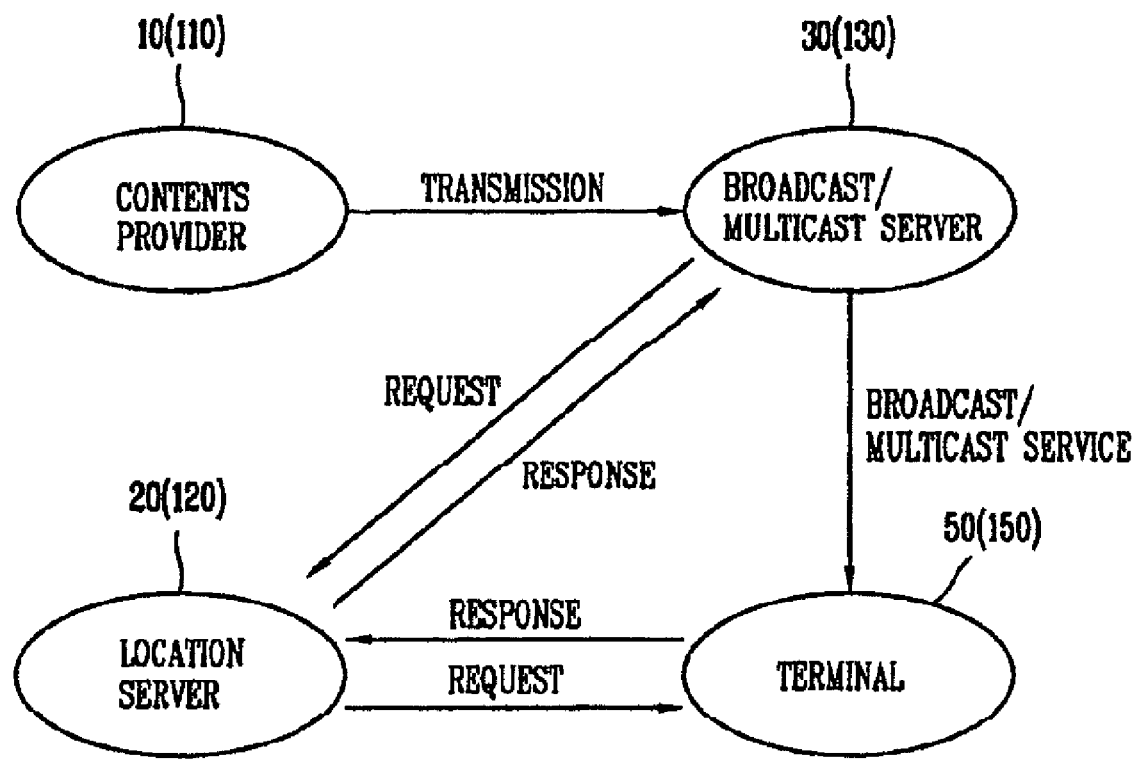
FIG. 1 is a block diagram showing the construction of a broadcast/multicast system in accordance with an embodiment of the present invention.

FIG. 1 is a block diagram showing the construction of a broadcast/multicast system in accordance with the present invention.

As shown in FIG. 1, the broadcast/multicast system includes a contents provider 10, a broadcast/multicast server 30 which checks area information from contents and information received from the contents provider 10 and provides the contents and information to a corresponding area through a broadcast/multicast service, a terminal 50 which receives the contents and information from the broadcast/multicast server 30 and transmits information inputted by a user, and a location server 20 which checks location information of the terminal 50. In this case, the contents provider 10 can simultaneously provide one or more contents to one or more terminals by using the broadcast/multicast service.

The terminal 50 includes a broadcast/multicast client receiving or requesting the broadcast/multicast service, and a location client receiving or requesting location information of a corresponding terminal. In this case, the broadcast/multicast client and the location client are sort of modules installed in the terminal.

A network for actually transmitting the contents and information between the terminal and the broadcast/multicast server includes an MBMS (Multimedia Broadcast/Multicast Service) of a 3GPP, a BCMCS (Broadcast Multicast Service) of a 3GPP2, or a DVB (Digital Video Broadcast). The network is comprehensively called BDS (Broadcast Distribution System).

The MBMS and BCMCS have both uplink channel and downlink channel, so interfacing between the broadcast/multicast server and the terminal in the same network can be possible. However, in case of the DVB, it has only the downlink channel, so if the terminal wants to perform communication with the broadcast/multicast server, it must be connected with a mobile communication network such as an EV-DO (Evolution Data Only) or a GSM (Global System for Mobile Communication) in order to use the uplink channel.

The system constructed as described above operates as follows.

The broadcast/multicast server receives contents from the contents provider and stores it. When the broadcast/multicast server receives current location information of a terminal from the location server or from a terminal which requests corresponding contents, it transmits contents to be provided to the pertinent area, among the stored contents, to the terminal of a user.

The broadcast/multicast server receives certain contents from the contents provider, classifies and stores it in a corresponding service area, receives current location information of a terminal from the location server or from the terminal requesting corresponding contents, and transmits contents provided in the corresponding area to the terminal of the user.

Although the broadcast/multicast server does not receive a service request from the terminal, it can provide contents and information corresponding to a current location of the terminal, and can transmit contents provided to a specific area requested by the user to the corresponding terminal regardless of the current location information of the service-requested terminal.

Figure 2:
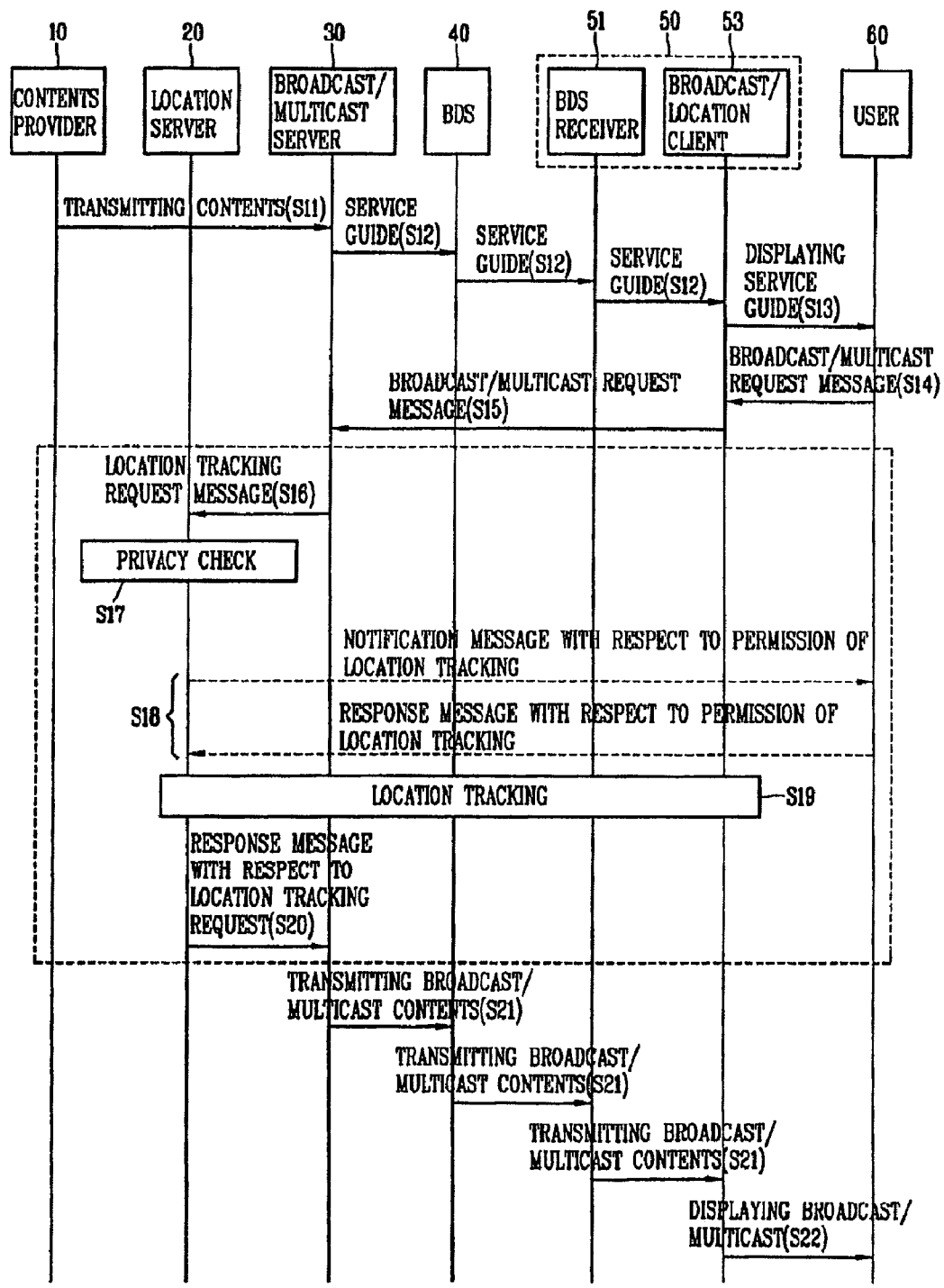
FIG. 2 is a signal flow chart of a broadcast/multicast service method in accordance with a first embodiment of the present invention.

FIGS. 2 and 3 are signal flow charts showing a broadcast/multicast service method based on user location information, in which the broadcast/multicast service can be implemented through a terminal of which a broadcast/multicast client and a location client can be connected to the same network. In this case, the network is the MBMS of the 3GPP or the BCMCS of the 3GPP2.

FIG. 2 is a signal flow chart of a broadcast/multicast service method in accordance with a first embodiment of the present invention, in which the broadcast/multicast server, which intends to transmit contents or information related to location information, directly receives location information of a corresponding terminal from the location server.

As shown in FIG. 2, the broadcast/multicast service system includes a contents provider 10, a location server 20, a broadcast/multicast server 20, a terminal 50 and an end user 60 that checks contents and information outputted to the terminal 50 and inputs certain information. The contents and information are transferred to the terminal 50 through a BDS 40. The terminal 50 includes a BDS receiver 51, a broadcast/multicast and location client 53. In this case, because the broadcast/multicast client and the location client of the terminal 50 are connected to the same network, the two clients are assumed as one entity, namely, the broadcast/location client 53.

The broadcast/multicast server 30 receives one or more contents from the contents provider 10 (step S11). The contents include information on area to which corresponding contents are scheduled to be transmitted, namely, information on an area to which the corresponding contents can be provided.

Upon receiving the contents, the broadcast/multicast server 30 generates a service guide by using a service time, place (location) and a related schedule of each contents, and transmits each service guide to terminals 50 of an every area where the broadcast/multicast service is provided. In this case, the broadcast/multicast server 30 can store the contents received from the contents provider in two ways. The first one is receiving and storing the contents, and the second one is checking area information included in the contents and storing the corresponding contents according to each service area as classified. The service guide includes an entire contents list which can be provided by the broadcast/multicast server or a contents list that a user has previously requested or discriminately selected based on preference information registered when the user subscribes for the service.

In the case that each program or contents of the service guide includes area information, condition information with respect to a factor for discriminating a specific area, contents based on location, and service features providing each contents must be included in a corresponding service guide entry.

For example, the factor for discriminating a specific area includes a name of an area, a detailed address, a postal code number, accurate location coordinates, or the like, the contents include classification information as to whether corresponding contents are an advertisement or weather information or the like, the service features include information whether corresponding contents are used for only one time or periodically used or whether it is provided when a terminal enters or moves out of a specific area. Information included in the service guide entry is to be described in detail.

When the terminal 50 receives the service guide through the BDS receiver 51, it displays the service guide through the broadcast/location client 53 so that the user 60 can check the service guide (step S13).

The user 60 checks several programs and contents from the displayed service guide and selects a service guide entry corresponding to contents desired to be received at a specific position or at its location among the contents (step S14). Then, a broadcast/multicast request message is transmitted to the broadcast/multicast server 30 through the broadcast/location client 53. In this case, the broadcast/multicast request message includes information of contents selected by the user and service features as to whether the contents is used for one time or periodically provided, or information whether the contents are provided when a terminal enters or moves out of a specific area, and an ID of the terminal. The contents information can include information on an area where the corresponding contents are provided.

When the broadcast/multicast server 30 receives the broadcast/multicast request message from the broadcast/location client 53, it transmits a location tracking request message to the location server 20 (step S16).

Upon receiving the location tracking request message, the location server 20 checks whether the location information of the corresponding terminal can be disclosed (which, for example, means that a specific terminal is set whether to allow for a third party to perform location tracking on the specific terminal itself, which is also called a 'privacy check') (step S17), and if user's permission is required for the location tracking, the location server 20 transmits a notification message with respect to permission of location tracking to the user 60, and the user transmits a response message to the notification message (step S18).

Location tracking of the terminal is performed between the location server 20 and the location client 53 (step S19). The location tracking can be performed by using an existing location tracking method defined in the 3GPP or 3GPP2 or by using a SUPL (Secure User Plane Location).

The location server 20 transmits a calculated location tracking value through a response message to the location tracking request message to the broadcast/multicast server 30 (step S20), and the broadcast/multicast server 30 transmits only contents corresponding to the current location tracking value among contents which have been selected by the user through the BDS 40 to the terminal 50 (step S21). In this case, the contents include the location tracking value of the corresponding terminal.

In the process of transmitting the contents by the broadcast/multicast server 30, in case that the contents received from the contents provider 10 are classified and stored according to each service area, contents of the corresponding service area are transmitted to the terminal 50, whereas if the received contents are stored as it is, contents that can be provided to the corresponding service area, among the stored contents, is transmitted to the terminal 50.

The contents are transferred to the broadcast/location client 53 through the BDS receiver 51 (step S21), and the broadcast/location client 53 outputs the corresponding contents for user's checking (step S22).

FIG. 4 illustrates items included in a service guide entry in accordance with the present invention.

The items shown in FIG. 4 are optionally added to indicate corresponding area information when contents list including area information is transmitted.

Of the items, 'broadcast_area' indicates including of area information for broadcasting/multicasting contents and includes 'target_area' or 'hor_acc' as sub-items.

'target area' is an item for a part to which contents are provided and includes sub-items of 'shape', 'cc', 'name_area' or 'zip_code'. 'hor_area' indicates a broadcast region with certain accuracy on a plane, which is, for example, used for setting a certain area on an electronic map.

'shape' is used to indicate a geographical form, 'cc' is a country code expressed by 1.about.3 digits, 'name_area' indicates a regional name, and 'zip_code' is an area code give to each area, corresponding to a postal code number.

The broadcast/multicast server 30 can divide a contents service area by using the items. For example, when a specific content is to be provided to a specific city, the broadcast/multicast server 30 optionally includes the items 'broadcast_area', 'target_area' and 'name_area=specific city' on a list of the corresponding contents.

The optional items are not only used for indicating a service available area of the contents list in the service guide but also for limiting an area to which each contents list is transmitted or an area to which contents are transmitted.

The location tracking request message that the broadcast/multicast server 30 transmits to the location server 20 and the response message with respect to the location tracking request message that the location server transmits to the broadcast/multicast server 30 can be expressed in the XML (eXtensible Markup Language) by using each factor and attribute defined in an MLP (Mobile Location Protocol) specification.

FIGS. 5A to 5C and 6A to 6G illustrate a location tracking request message and a corresponding response message expressed in an XML (extensible Markup Language). In detail, FIGS. 5A to 5C illustrate embodiments of messages used for tracking a location only one time, and FIGS. 6A to 6G illustrate embodiments of messages used for tracking a location periodically or tracking a location when a specific event occurs.

Specifically, FIG. 5A shows a general one-time location tracking request message corresponding to a location tracking request message, which includes an ID of a terminal which requests location tracking, location tracking accuracy having time delay and spatial accuracy, a type of a location tracking value, and setting of a priority level.

FIG. 5B shows an ACK message with respect to the general one-time location tracking request, which can include a result value such as whether location tracking is successful.

FIG. 5C shows a response message with respect to the general one-time location tracking request, which includes only a location tracking value.

FIG. 6A shows a periodical location tracking request message, and FIG. 6B shows a location tracking message in case where a specific even occurs, namely, for example, when a terminal enters or moves out of a specific area.

The location tracking message includes an ID of a terminal which requests location tracking, discrimination as to whether it is periodical location tracking or location tracking with respect to occurrence of a specific event, and a period for requesting location tracking, its start time and termination time in case of the periodical location tracking, and characters of an event (e.g., whether a terminal enters, moves out of or located within a specific area) and a name or an accurate location value of a specific area in case of tracking a location with respect to occurrence of a specific event. The location tracking message includes location tracking accuracy having time delay and spatial accuracy, a type of a location tracking value, and setting of a priority level.

FIGS. 6C and 6D show ACK messages with respect to the periodical location tracking request or the location tracking request in occurrence of a specific event, namely, showing embodiment of a case where a response can be made to a location tracking request and a case where a response cannot be made to a location tracking request.

FIG. 6E shows a location tracking value transmitted as a response message with respect to a periodical location tracking request or a location tracking request when a specific event occurs.

FIG. 6F shows a cancellation message with respect to the periodical location tracking request or the location tracking request in case where a specific event occurs, and FIG. 6G shows an ACK message with respect to a minimum message.

Namely, the broadcast/multicast server 30 transmits the one-time location tracking request message, the periodical location tracking request message or the location tracking request message in occurrence of a specific event to the location server 20 according to characteristics of contents selected by a user.

In order for the broadcast/multicast server 30 to transmit only the contents corresponding to the location tracking value, a process for matching information on each contents received from the contents provider 10 and information of the terminal is required.

FIG. 7 shows a search table of a database of the broadcast server 30, which includes items of a service area, a list of contents provided to each service area, an ID of a terminal subscribed for a service, and a user input value.

For example, a terminal with an ID of A1 is set to receive contents of an advertisement, weather, stock information but not contents of fashion. Then, when a location tracking value of the terminal corresponds to the area 'A', the broadcast/multicast server transmits the contents of the advertisement, weather and stock information and does not transmit the contents of fashion. In this case, by adding such an item of area information as shown in FIG. 4 as an option to the contents transmitted to the area 'A', the service area can be restricted.

FIG. 3 is a signal flow chart of a broadcast/multicast service method in accordance with a second embodiment of the present invention, in which the broadcast/multicast server which transmits contents related to area information receives location information of a corresponding terminal from the terminal (user).

The broadcast/multicast server 30 receives one or more contents from the contents provider 10 (step S31), generates a service guide by using a service time, a service position and a schedule of the contents, and then transmits the service guide to terminals 50 of each area where the broadcast/multicast service is provided through the BDS 40 (step S32). In this case, the broadcast/multicast server 30 can check area information included in the contents, classify corresponding contents according to each service area and store it, or store the corresponding contents without classification. The service guide includes an entire contents list that can be provided by the broadcast/multicast server 30 or includes a contents list selected based on preference information that the user previously requested or registered when having subscribed for the service.

Upon receiving the service guide through the BDS receiver 51, the terminal 50 displays the service guide through the broadcast/location client 53 to allow the user 60 to check the service guide (step S33).

When the user 60 selects contents desired to be received at a specific location or at his/her current location among the contents of the displayed service guide (step S34), a broadcast/multicast request message is transmitted to the broadcast/multicast server 30 through the broadcast/location client 53 (step S35). In this case, the broadcast/multicast request message includes information on an area to which the contents selected by the user is provided.

The broadcast/location client 53 transmits also a location tracking request message to the location server 20 as well as the broadcast/multicast request message (step S36). In this case, the location tracking request message is transmitted as a format of a one-time location tracking request message, a periodical location tracking request message or a location tracking request message in case where a specific event occurs.

Upon receiving the location tracking request message, the location server 20 calculates a location tracking value by using an existing location tracking method or an SUPL (step S37), includes the location tracking value in a response message with respect to the location tracking request, and then transmits it to the broadcast/location client 53 of the corresponding terminal (step S38).

Upon receiving the response message, the broadcast/location client 53 transfers the location tracking value to the broadcast/multicast server 30 (step S39), and the broadcast/multicast server 30 transmits only contents corresponding to the location tracking value among the contents selected by the user to the terminal 50 through the BDS 40 (step S40). In this case, the contents include the location tracking value of the corresponding terminal. Herein, in case that the broadcast/multicast server 30 classifies the contents which have been received from the contents provider 10 according to each area and stores it, it transmits the contents of the corresponding service area to the terminal 50, whereas if broadcast/multicast server 30 stores the contents without classification of the service area, it transmits the contents of the corresponding service area among the stored contents to the terminal 50.

The contents transferred to the broadcast/location client 53 through the BDS receiver 51 are outputted for user's checking (step S41).

Figure 8:
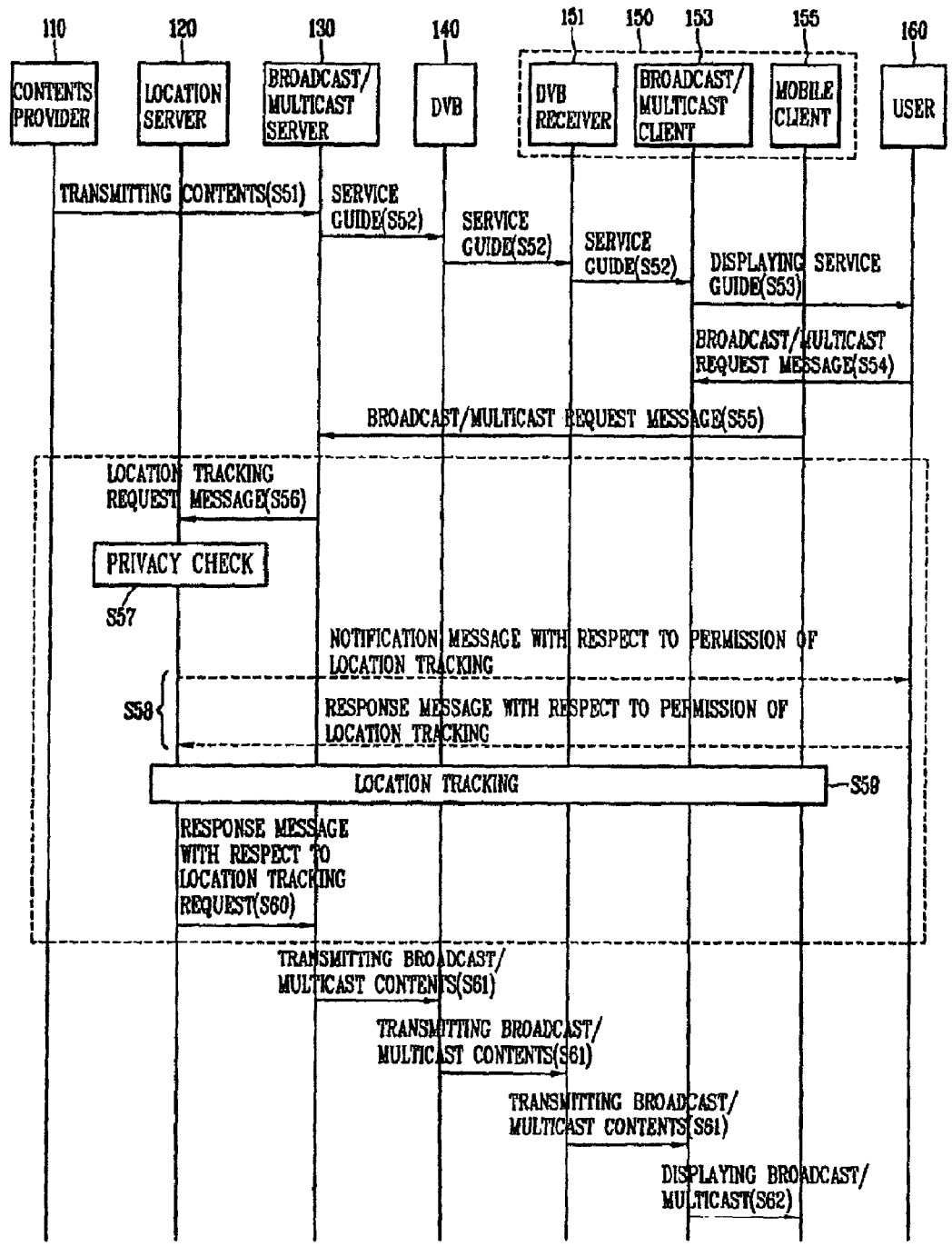
FIG. 8 is a signal flow chart of a broadcast/multicast service method in accordance with a third embodiment of the present invention.
Figure 9:
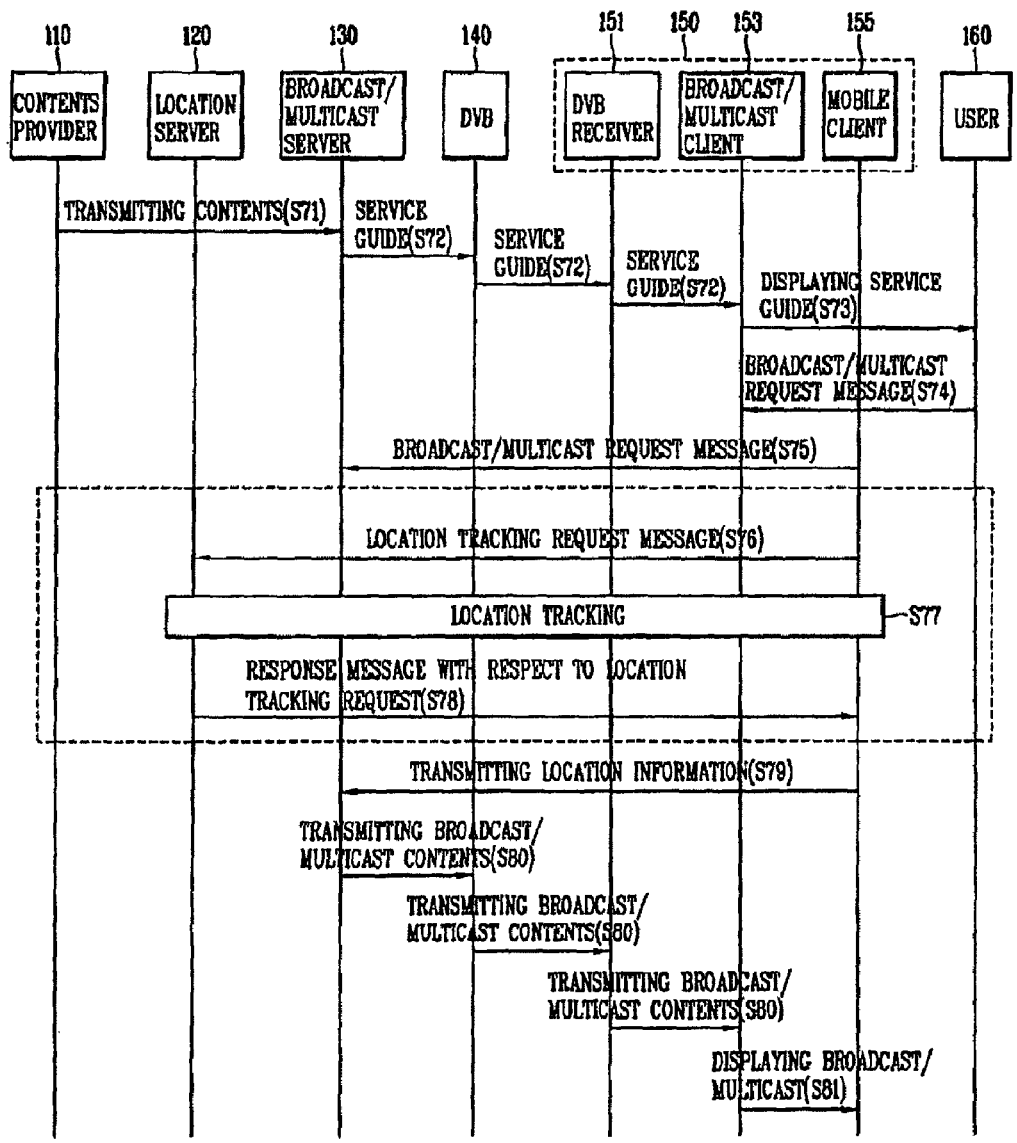
FIG. 9 is a signal flow chart of a broadcast/multicast service method in accordance with a fourth embodiment of the present invention.

FIG. 8 is a signal flow chart of a broadcast/multicast service method in accordance with a third embodiment of the present invention, and FIG. 9 is a signal flow chart of a broadcast/multicast service method in accordance with a fourth embodiment of the present invention, showing implementation of a broadcast/multicast service through a terminal whose broadcast/multicast client and location client cannot be connected with the same network. In this case, the broadcast/multicast service is received through the DVB while a location information request is transmitted through the 3GPP or the 3GPP2. Because the DVB has only the downlink channel without an interaction channel, the location information is transmitted through the uplink channel of a network defined in the 3GPP and the 3GPP2.

As shown in FIGS. 8 and 9, a terminal 150, which receives a broadcast/multicast service through a DVB network 140, includes a DVB receiver 151, a broadcast/multicast client 153, a mobile client 155 for transmitting a location tracking request message to a broadcast/multicast server 130 or to a location server 120, and a user 160. Namely, the broadcast/multicast client 153 operates as a reception dedicated client and the mobile client 155 operates as a transmission dedicated client for transmitting specific information except for transmitting current location information of a corresponding terminal to the broadcast/multicast server 130.

The broadcast/multicast service method in case where the broadcast/multicast server 130 which is to transmit contents related to area information directly receives location information of a corresponding terminal 150 from the location server 120 will now be described with reference to FIG. 8.

When the broadcast/multicast server 130 receives one or more contents from the contents provider 110 (step S51), it generates a service guide by using a service time, a service position and a schedule of the contents, and then transmits the service guide to terminals 150 of every area where the broadcast/multicast service is provided through the BDS 40 (step S52). In this case, the broadcast/multicast server 130 can check area information included in the contents, classify corresponding contents according to each service area and store it, or store the corresponding contents without classification. The service guide includes an entire contents list that can be provided by the broadcast/multicast server 130 or includes a contents list selected based on preference information that the user has been previously requested or registered when having subscribed for the service.

The service guide which has been received through the BDS receiver 51 is displayed through the broadcast/multicast client 153 for user's checking (step S53).

When the user 160 selects contents desired to be received at his/her current location or at a specific location among the contents of the displayed service guide (step S54), the mobile client 155 transmits a broadcast/multicast request message to the broadcast/multicast server 130 (step S35). In this case, the broadcast/multicast request message can include information on an area to which the contents selected by the user is provided.

Upon receiving the broadcast/multicast request message, the broadcast/multicast server 130 transmits a location tracking request message to the location server 120 (step S56), and the location server 120 checks whether the location information of the corresponding terminal 150 can be disclosed (step S57). If user's permission is required with respect to the location tracking, the location server 120 transmits a notification message with respect to permission of the location tracking to the user 160 and then receives a response message (step S58). In this case, the location tracking request message is transmitted as a format of a one-time location tracking request message, a periodical location tracking request message or a location tracking request message in case where a specific event occurs.

The location server 120 calculates a location tracking value by using an existing location tracking method or an SUPL (step S59), and transmits the location tracking value through a response message with respect to the location tracking request to the broadcast/multicast server 130 (step S60).

The broadcast/multicast server 130 transmits only contents corresponding to the location tracking value among the contents selected by the user to the terminal 150 through the DVB 140 (step S61), and the broadcast/multicast client 153 receives and outputs the contents (step S62).

Herein, in case that the broadcast/multicast server 130 classifies the contents which have been received from the contents provider 110 according to each area and stores it, it transmits the contents of the corresponding service area to the terminal 150, whereas if broadcast/multicast server 130 stores the contents without classification of the service area, it transmits the contents of the corresponding service area among the stored contents to the terminal 150.

The broadcast/multicast service method in case where the broadcast/multicast server which transmits contents related to area information directly receives location information of a corresponding terminal 150 from the terminal will now be described with reference to FIG. 9.

When the broadcast/multicast server 130 receives one or more contents from the contents provider 110 (step S71), it generates a service guide by using a service time, a service position and a schedule of the contents, and then transmits the service guide to terminals 150 of every area where the broadcast/multicast service is provided through the BDS 40 (step S72). In this case, the broadcast/multicast server 130 can check area information included in the contents, classify corresponding contents according to each service area and store them, or store the corresponding contents without classification. The service guide includes an entire contents list that can be provided by the broadcast/multicast server 130 or includes a contents list selected based on preference information that the user has been previously requested or registered when having subscribed for the service.

The service guide is received by the broadcast/multicast client 153 through a DVB receiver 151 of the terminal 150, and the broadcast/multicast client 153 displays it to allow a user 160 to check it (step S73).

When the user 160 selects a service guide entry of contents desired to be received at his/her current location or at a specific location (step S74), the mobile client 155 transmits a broadcast/multicast request message to the broadcast/multicast server 130 (step S75) and a location tracking request message to the location server 120 (step S76). In this case, the broadcast/multicast request message and the location tracking request message are transmitted to the broadcast/multicast server 130 and to the location server 120 through the uplink of the 3GPP or 3GPP2, not through the DVB network 140.

Upon receiving the location tracking message, the location server 120 calculates a location tracking value by using an existing location tracking method or an SUPL (step S77), includes the location tracking value in a response message with respect to the location tracking request, and then transmits it to the mobile client 155 of the corresponding terminal 150 (step S78).

Upon receiving the response message, the mobile client 155 transfers the location tracking value to the broadcast/multicast server 130 (step S79), and the broadcast/multicast server 130 transmits only contents corresponding to the location tracking value among the contents that can be provided to the corresponding terminal, to the terminal 150 through the DVB network 140 (step S80). In this case, the contents include the location tracking value of the corresponding terminal. Herein, in case that the broadcast/multicast server 130 classifies the contents which have been received from the contents provider 110 according to each area and stores it, it transmits the contents of the corresponding service area to the terminal 150, whereas if broadcast/multicast server 30 stores the contents without classification of the service area, it transmits the contents of the corresponding service area among the stored contents to the terminal 150.

Upon receiving the contents through the DVB receiver 151, the broadcast/multicast client 153 outputs the contents (step S81).

In this embodiment, when the broadcast/multicast server receives a response for specific contents from the terminal, it provides the corresponding contents to the terminal. In this respect, however, although the broadcast/multicast server does not receive a request for contents from the terminal, it can check a location of the terminal through the location server to selectively provide contents according to a current location of the terminal, or can provide contents requested by the user regardless of the current location of the terminal.

For example, when the broadcast/multicast server 30 receives contents from the contents provider 10, it can check the terminal positioned in a specific area through the location server 20 and transmit contents that can be provided to the corresponding area to terminals 50 within the area.

In addition, when the broadcast/multicast server 30 receives contents from the contents provider 10, it can classify/store the contents according to a service area by using area information of the contents, and then, when a terminal requests contents of a specific area, the broadcast/multicast server 30 transmits contents of the corresponding area to the terminal 50.

As so far described, the broadcast/multicast service method based on user location information in accordance with the present invention has many advantages.

That is, for example, because only pre-set information or contents is/are selectively provided based on user location information, a waste of a communication channel can be prevented.

In addition, since the user selectively receives contents or information according to his/her current location, user's satisfaction and convenience with respect to a service can be enhanced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A broadcast/multicast service method based on user location information, the method comprising:

transmitting, by a broadcast/multicast server which has received certain contents from a contents provider, a service guide including service-available area information to one or more terminals, wherein the service-available area information allows for location based targeting of services based on target areas in which the broadcast/multicast service is available;

receiving, by the broadcast/multicast server, a broadcast/multicast request message with respect to one or more contents selected by a user of a specific terminal from the service guide;

receiving current location information of the specific terminal from the specific terminal, the current location information of the specific terminal indicating an exact current location of the specific terminal to allow the location based targeting of services based on the target areas; and transmitting, to the specific terminal, contents corresponding to the exact current location of the specific terminal among the contents selected by the user according to location based targeting of services performed by the broadcast/multicast server, wherein the transmitting of the service guide, the receiving of the broadcast/multicast request message, the receiving of the current location information, and the transmitting of the contents are performed by cooperation between the broadcast/multicast server that utilizes location information in Mobile Location Protocol (MLP) format and the specific terminal that supports use of location information in the MLP format.

2. The method of claim 1, further comprising:
classifying, by the broadcast/multicast server, the contents which have been received from the contents provider according to the service-available area information; and
storing the classified contents.

3. The method of claim 1, wherein the user selects contents desired to be received at a specific location or at a current location.

4. The method of claim 1, wherein the step of receiving current location information from the specific terminal comprises:
transmitting a location tracking request message to a network entity by the specific terminal;
receiving a response message with respect to the location tracking request message from the network entity, the response message including a location tracking value of the specific terminal; and
transmitting, by the specific terminal, the current location information of the specific terminal to the broadcast/multicast server, the current location information including the location tracking value of the specific terminal.

5. The method of claim 4, wherein the location tracking request message and the corresponding response message have the MLP (Mobile Location Protocol) format.

6. A method for providing a broadcast/multicast service based on user location information in which a broadcast/multicast service is provided to at least one or more terminals, each terminal having a client module for performing transmission/reception through a network, the method comprising:

receiving, by the client module, a service guide including service-available area information with respect to one or more contents from a broadcast/multicast server, wherein the service-available area information allows for location based targeting of services based on target areas in which the broadcast/multicast service is available;

transmitting, by the client module, a broadcast/multicast request message with respect to contents selected by a user of a specific terminal among the contents information included in the received service guide to the broadcast/multicast server;

transmitting, by the client module, a location tracking request message with respect to the specific terminal to a network entity;

receiving a response message with respect to the location tracking request message, the response message including a location tracking result from the network entity;

transmitting, by the client module, location information of the specific terminal to the broadcast/multicast server, the location information of the specific terminal indicating an exact current location of the specific terminal to allow the location based targeting of services based on the target areas; and receiving contents corresponding to the exact current location of the specific terminal, among the contents selected by the user, from the broadcast/multicast server, wherein the receiving of the service guide, the transmitting of the broadcast/multicast request message, the transmitting of the location tracking request message, the receiving of the location tracking result, the transmitting of the location information, and the receiving of the contents are performed by cooperation between the broadcast/multicast server that utilizes location information in Mobile Location Protocol (MLP) format and the specific terminal having the client module that supports use of location information in the MLP format.

7. The method of claim 6, further comprising:

classifying contents, which has been received from contents provider, according to its service available area by the broadcast/multicast server.

8. The method of claim 6, wherein the broadcast/multicast server stores the contents received from the contents provider, and transmits the contents based on current location information of the corresponding terminal.

9. The method of claim 6, wherein the location tracking request message and its corresponding response message have the MLP (Mobile Location Protocol) format.

10. A mobile terminal for providing a broadcast/multicast service based on user location information, the mobile terminal comprising:

a transceiver configured to receive and transmit signals through a network; and a client module configured to cooperate with the transceiver and to:

receive a service guide including service-available area information with respect to one or more contents from a broadcast/multicast server, wherein the service-available area information allows for location based targeting of services based on target areas in which the broadcast/multicast service is available;

transmit a broadcast/multicast request message with respect to contents selected by a user among the contents information include in the received service guide, to the broadcast/multicast server;

transmit a location tracking request message with respect to the mobile terminal to a network entity;

receive a response message with respect to the location tracking request message, the response message including a location tracking result from the network entity;

transmit location information of the mobile terminal to the broadcast/multicast server, the location information of the mobile terminal indicating an exact current location of the mobile terminal to allow the location based targeting of services based on the target areas; and receive contents corresponding to the exact current location of the mobile terminal, among the contents selected by the user, from the broadcast/multicast server, wherein the receiving of the service guide, the transmitting of the broadcast/multicast request message, the transmitting of the location tracking request message, the receiving of the location tracking result, the transmitting of the location information, and the receiving of the contents are performed by cooperation between the broadcast/multicast server that utilizes location information in Mobile Location Protocol (MLP) format and the mobile terminal having the client module that supports use of location information in the MLP format.

11. The mobile terminal of claim 10, wherein the client module is further configured to classify contents, which has been received from contents provider, according to its service available area by the broadcast/multicast server.

12. The mobile terminal of claim 10, wherein the client module comprises:

a broadcast/multicast client module which requests or receives a broadcast/multicast service; and a location client module which requests or receives user location information.

13. The mobile terminal of claim 10, wherein the location tracking request message and its corresponding response message have the MLP (Mobile Location Protocol) format.

* * * * *